(12) United States Patent
Hedtke et al.

(10) Patent No.: US 9,470,084 B2
(45) Date of Patent: Oct. 18, 2016

(54) METHOD AND APPARATUS FOR MEASURING FLUID PROCESS VARIABLE IN A WELL

(75) Inventors: Robert C. Hedtke, Young America, MN (US); Liangju Lu, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 118 days.

(21) Appl. No.: 12/855,127

(22) Filed: Aug. 12, 2010

(65) Prior Publication Data

US 2012/0036924 A1 Feb. 16, 2012

(51) Int. Cl.

| | |
|---|---|
| *E21B 21/08* | (2006.01) |
| *E21B 47/10* | (2012.01) |
| *E21B 47/06* | (2012.01) |
| *E21B 47/18* | (2012.01) |
| *G01K 11/26* | (2006.01) |
| *G01L 11/04* | (2006.01) |

(52) U.S. Cl.
CPC ............. *E21B 47/101* (2013.01); *E21B 47/06* (2013.01); *E21B 47/065* (2013.01); *E21B 47/18* (2013.01); *G01K 11/26* (2013.01); *G01L 11/04* (2013.01)

(58) Field of Classification Search
CPC ........ E21B 49/10; E21B 49/08; E21B 47/10; E21B 47/06; G01N 33/2833
USPC .............................................. 73/152.55, 702
See application file for complete search history.

(56) References Cited

U.S. PATENT DOCUMENTS

| | | | |
|---|---|---|---|
| 4,102,195 A | 7/1978 | Thompson et al. ............ 73/340 |
| 5,471,882 A | 12/1995 | Wiggins | |
| 6,513,596 B2 | 2/2003 | Wester .......................... 166/336 |
| 6,938,470 B2 * | 9/2005 | DiFoggio ................ E21B 47/10 |
| | | | 175/40 |
| 7,562,557 B2 * | 7/2009 | Bennett et al. .............. 73/24.06 |
| 7,994,932 B2 | 8/2011 | Huang et al. | |
| 2004/0123645 A1 | 7/2004 | Storm, Jr. et al. ................. 73/32 |
| 2010/0132471 A1 * | 6/2010 | Hedtke ................... G01F 1/363 |
| | | | 73/702 |

FOREIGN PATENT DOCUMENTS

| | | |
|---|---|---|
| EA | 200601616 | 2/2007 |
| EA | 008325 | 4/2007 |

(Continued)

OTHER PUBLICATIONS

International Search Report and Written Opinion for PCT Application No. PCT/US2011/047027, dated Apr. 4, 2012, 10 pages.

(Continued)

*Primary Examiner* — Hezron E Williams
*Assistant Examiner* — Rodney T Frank
(74) *Attorney, Agent, or Firm* — Westman, Champlin & Koehler, P.A.

(57) ABSTRACT

A sensor system for sensing a process variable of fluid at a first location including a variable resonator disposed at the first location having a resonant frequency which varies in response to the process variable of the fluid and responsively provides a resonant acoustic signal at the resonant frequency indicative of the process variable. An acoustic sensor disposed at a second location which is spaced apart from the variable resonator is configured to receive the resonant acoustic signal transmitted from the variable resonator. Measurement circuitry coupled to the acoustic sensor configured to provide a process variable output related to the process variable of the fluid in response to the received resonant acoustic signal.

13 Claims, 6 Drawing Sheets

(56) References Cited

FOREIGN PATENT DOCUMENTS

| EA | 013572 | 6/2010 |
|---|---|---|
| JP | 53-98888 | 8/1978 |
| JP | 56-125595 | 10/1981 |
| RU | 2 039 234 | 7/1995 |
| SU | 757824 | 8/1980 |
| SU | 767824 | 9/1980 |
| SU | 1606694 | 11/1990 |
| SU | 1640396 | 4/1991 |
| WO | WO 01/73380 | 10/2001 |
| WO | WO 2010/065282 | 6/2010 |

OTHER PUBLICATIONS

Office Action from Japanese Application No. 2013-524162, dated Mar. 4, 2014.
Office Action from Chinese Patent Application No. 201110188773.3, dated Oct. 27, 2014.
Decision on Grant from Russian Application No. RU 2013110510, dated Jun. 9, 2014.
Office Action from Chinese Application No. 201110188773.3 dated Mar. 3, 2014.
Office Action from Canadian Application No. 2,808,181, dated Apr. 22, 2014.
Office Action from Russian Application No. 2013110510, dated Feb. 24, 2014.
Office Action from Canadian Patent Application No. 2,808,181, dated Feb. 12, 2015.
Office Action from Canadian Patent Application No. 2,808,181, dated Dec. 21, 2015.
Communication from corresponding EP Application No. 11 758 590.1, dated Nov. 20, 2013.

* cited by examiner

METHOD AND APPARATUS FOR MEASURING FLUID PROCESS VARIABLE IN A WELL

BACKGROUND OF THE INVENTION

The present invention relates to measurements performed in wells. More specifically, the present invention relates to measurement of process variables of a fluid in a down hole location in a well.

Deep wells are one known technique for extracting fluid from the earth. Well drilling technology is an advanced art and many techniques have been developed to increase the depth of wells and also their configuration.

During the operation and drilling of deep wells, such as oil wells, it is often desirable to measure process variables of the fluid at a "down hole" location of the well. Such process variables include pressure and temperature. However, the down hole location of a deep well can be a particularly harsh environment. Pressures may surpass 15,000 psi and temperatures may reach 375 degrees Fahrenheit. Further, the distance from the surface to a deep down hole location of the well may be great, for example, over 15,000 feet. Thus, it is difficult to place measurement equipment at a deep down hole location and any such equipment must be of a sufficiently robust design to withstand the harsh environmental conditions. Further, any measurements taken at the down hole location must then be transmitted back to the surface.

SUMMARY OF THE INVENTION

A sensor system for sensing a process variable of fluid at a first location including a variable resonator disposed at the first location having a resonant frequency which varies in response to the process variable of the fluid and responsively provides a resonant acoustic signal at the resonant frequency indicative of the process variable. An acoustic sensor disposed at a second location which is spaced apart from the variable resonator is configured to receive the resonant acoustic signal transmitted from the variable resonator. Measurement circuitry coupled to the acoustic sensor is configured to provide a process variable output related to the process variable of the fluid in response to the received resonant acoustic signal.

DETAILED DESCRIPTION OF ILLUSTRATIVE EMBODIMENTS

Wells are used to extract fluids such as crude oil, from locations deep beneath the earth's surface. During drilling of wells and during other operation, it can be beneficial to measure properties of the fluid ("process variables") at "down hole" locations. Process variables include pressure and temperature. However, measurement of these properties can be a significant engineering challenge. Placement of electronic equipment at the down hole location is possible, but can be costly and unreliable. The electronics often will not survive the high temperatures and pressures present in many wells. The packaging should be configured to provide protection to the electronics from the high pressures. The high temperatures make batteries either unusable or result in a very short battery life. Wiring from the surface for power and communication is costly and unreliable.

With the present invention, a passive down hole fluid process variable measurement system is provided. In one configuration, a variable resonator is provided at the down hole location which has a resonant frequency which varies based upon the process variable of the down hole fluid. This resonant frequency can be measured using any appropriate technique. In one example, an acoustic source at a surface or remote location directs acoustic energy down the well to the down hole location. In another example, acoustic energy is generated within the well itself, for example, by the flow of fluid in the well. The resonant acoustic signal from the variable resonator is then transmitted to the surface. The resonant signal has a frequency component related to the resonant frequency of the variable resonator. An acoustic sensor at the surface location receives the resonant signal. Measurement circuitry is configured to measure the resonant signal, for example the frequency or amplitude of the resonant signal, and provide an output related to the process variable of the down hole fluid. This configuration allows real time measurement of down hole fluid properties both during drilling, as well as during operation of a well.

Figure 1:
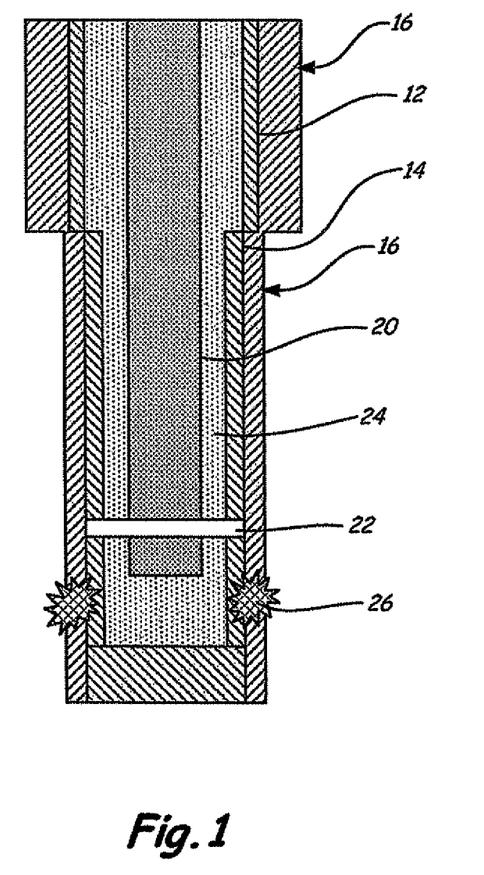
FIG. 1 is a simplified diagram of a cross sectional view of a well.

FIG. 1 is an exaggerated cross sectional view of a well drilling apparatus. As an example, a forty-inch diameter hole is drilled to 1,000 feet, and a 16-inch diameter hole is drilled to 15,000 feet. A 30-inch steel plate (casing) 12 is installed to 1,000 feet and a 12-inch steel pipe (casing) 14 is installed to 15,000 feet. Grout 16 is poured inside the casing to the bottom of the well (the down hole). The casing is then pressurized to force the grout up the outside of the well between the casing and the hole. The grout 16 dries and seals the well. A three-inch pipe 20 is then installed inside the casing to the well bottom. A packer (heavy gasket) 22 is installed at the well bottom between the pipe 20 and the casing 14. The space from the packer to the surface is back-filled with packer fluid (such as water or diesel) 24. Explosives 26 are then detonated at a position below the packer through the casing and into, for example, an oil formation.

As discussed previously, the down hole location of the well can be a particularly harsh environment. For new wells, the down hole can experience pressures that exceed 15,000 psi. If not controlled, this will cause a "gusher" as the down hole pressure exceeds the head pressure of approximately 4,000 psi. Further, the down hole temperatures can exceed 375° F.

Placing a sensor at the down hole location is a significant technical challenge. It is difficult to communicate information back to the surface using wires, fiber optics or wireless techniques such as RF. Powering the device from the surface may also be a challenge because long wires must be provided. A local power source may be used such as a battery but it must be able to operate under the harsh conditions. The measurement device itself is also difficult to design because it must be capable of withstanding the high pressures and temperatures.

The present invention utilizes acoustical transmissions and characteristics of an acoustic signal to determine a parameter or process variables of the down hole fluid such as pressure or temperature. The speed of sound in gases, liquids and solids is generally predictable based upon the medium's density and elastic properties, called the bulk modulus. The elastic properties of the medium will determine how much the medium will compress in response to a given amount of external pressure. The ratio of the change in pressure to the fractional volume compression is called the bulk modulus of the material. Typical propagation speeds of an acoustic signal (the speed of sound) in different materials are: water having a propagation speed of 1,482 m/s at 20° C., oil having a propagation speed of 1,200 m/s, steel having a propagation speed of 4,512 m/s and dry air having a propagation speed of 343 m/s at 20° C.

Sympathetic resonance is a harmonic phenomenon in which a passive body responds to external vibrations to which it has a harmonic likeness. This can be demonstrated using a simple example in which two similar tuning forks are provided. One of the tuning forks is mounted onto a solid object. If the other tuning fork is struck and then placed in contact with the solid object, vibrations are transmitted through the object and the mounted tuning fork will resonate. This example shows how energy can be transferred and stored between resonant systems.

Figure 2:
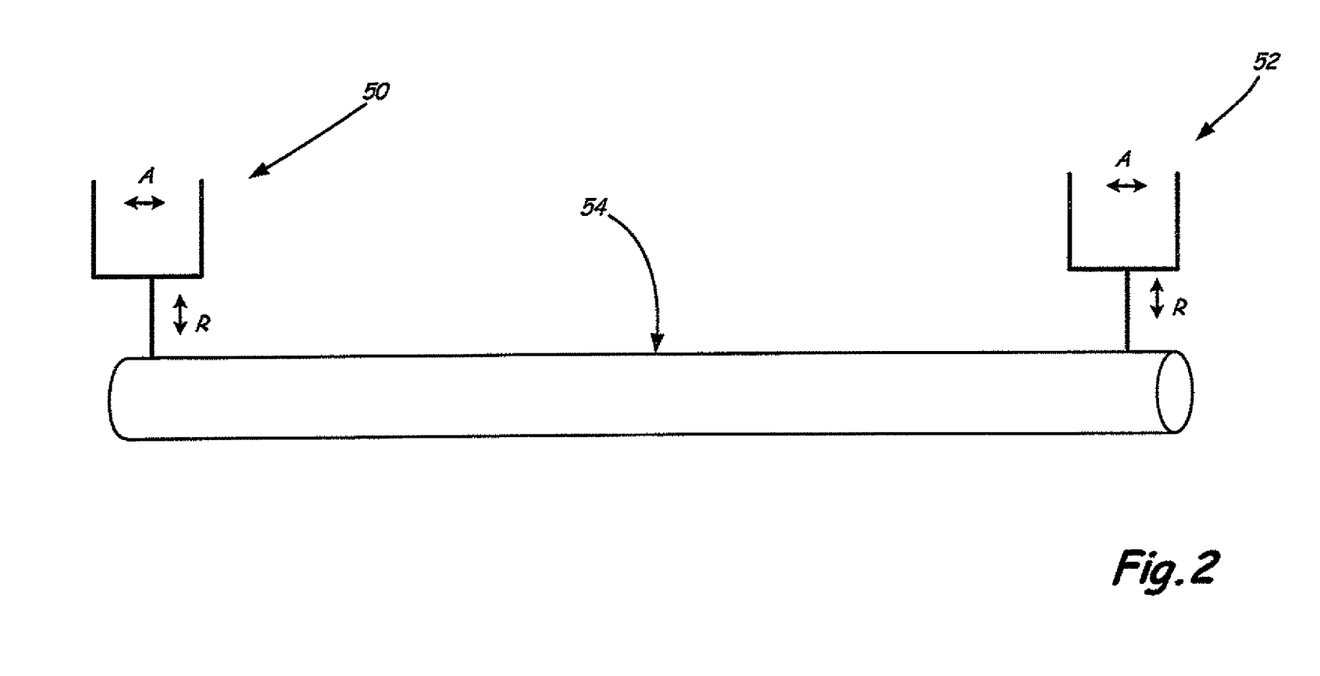
FIG. 2 is a diagram which illustrates sympathetic resonance.

FIG. 2 is a simplified diagram showing transmit tuning fork 50 and receive tuning fork 52 both coupled to a elongate body 54 which can be considered to represent a pipe in a drilling operation. In this example, tuning forks 50 and 52 are identical and coupled to the pipe 54, for example, by a weld. If the transmit fork 50 is struck, the axial vibration "A" will cause a simultaneous radial vibration "R". This acoustic wave will propagate along the pipe 54 causing receive fork 52 to resonate as shown by the arrows "R" and "A". If the transmit fork 50 is muted, the receive fork 52 will continue to vibrate and cause an acoustic wave to be transmitted back to the received fork 50 causing the received fork 50 to resonate again.

Figure 3:
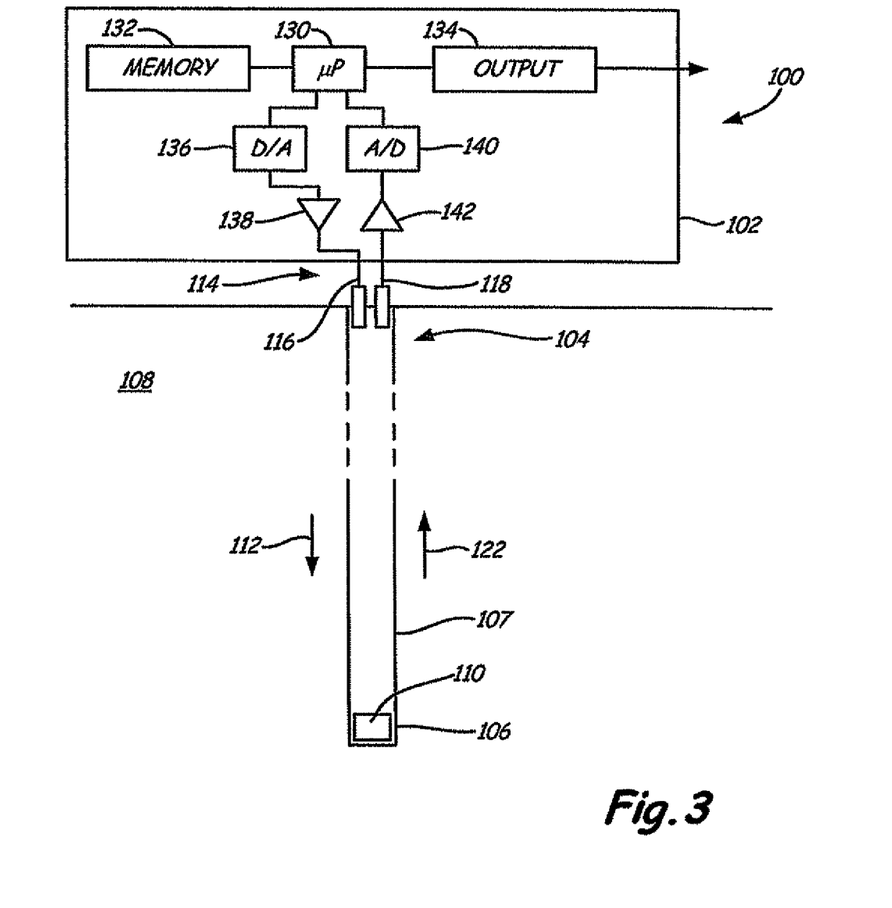
FIG. 3 is a block diagram showing an apparatus in accordance with one embodiment of the present invention for measuring a parameter of a fluid at a down hole location in a well.

FIG. 3 is a simplified block diagram of one embodiment of the invention showing a down hole measurement system 100 including measurement circuitry 102 coupled to a well 104 which extends through the ground 108 to a down hole location 106 of a pipe 107. A variable resonator 110 is positioned at the down hole location 106 and receives an acoustic signal 112 generated by an acoustic transducer 114. Acoustic transducer 114 includes an acoustic source 116 and an acoustic sensor 118.

Variable resonator 110 receives the transmitted acoustic signal 112 and begins to resonate as a function of a process variable of fluid at the down hole location 106. This causes a reflected acoustic signal 122 to be returned along the length of the well pipe 107. The acoustic sensor 118 of transducer receives the reflected acoustic signal 122. Measurement circuitry 102 is coupled to transducer 114. Circuitry 102 preferably includes a microprocessor 130 coupled to a memory 132 and an output 134. A digital to analog converter 136 is connected to microprocessor 130 and provides a digital output to amplifier 138. An analog to digital converter 140 receives a signal from amplifier 142 and provides a digitized output to microprocessor 130.

During operation, in this embodiment, microprocessor 130 causes acoustic transducer 114 to generate an acoustic signal 112 by providing a digital signal to digital to analog converter 136. This produces an analog signal which is amplified by amplifier 138 and converted into an acoustic signal by acoustic source 116. As described above, the variable resonator 110 generates a reflected acoustic signal 122 which is received by acoustic sensor 118 of transducer 114. Sensor 118 provides an analog signal to amplifier 142 which provides an amplified signal to analog to digital converter 140. Analog to digital 140 digitizes the amplified signal and provides a digitized output to microprocessor 130. Microprocessor 130 operates in accordance with instructions stored in memory 132 and is configured to provide an output using output circuitry 134. The output is indicative of a process variable of a fluid at the down hole location 106. The output from output circuitry 134 can comprise, for example, a local display or a local output, or can be transmitted to a remote location using, for example, wired or wireless communication techniques. One example wired communication technique is a two wire process control loop in which both data and power are provided over the same two wires. For example, a 4-20 mA current can be controlled on the two wires by the output circuitry 134 and used to provide an indication of the sensed process variable of the fluid. In another example, digital information can be modulated onto the two wire loop. The two wire loop can couple to a local location such as a control room or the like which can be also configured to provide power to the system. Alternatively, various wireless communication solutions could be used.

According to one embodiment, microprocessor 130 can be configured to cause acoustic signal 112 to be swept through a range of frequencies. By monitoring the reflected acoustic signal 122, a peak in the reflected signal 122 can be identified with respect to a particular frequency of group of frequencies. This information can be correlated to the sensed process variable of the fluid at the down hole location 106. The variable resonator 110 can be in accordance with any appropriate technology in which the resonant frequency of the resonator 110 changes as a function of one or more parameters of a fluid. Examples include pressure, temperature, chemical composition, viscosity, or others. As used herein "acoustic" and "acoustic signal" refer to any type of vibration signal and are not limited to a particular frequency range.

Figure 4:
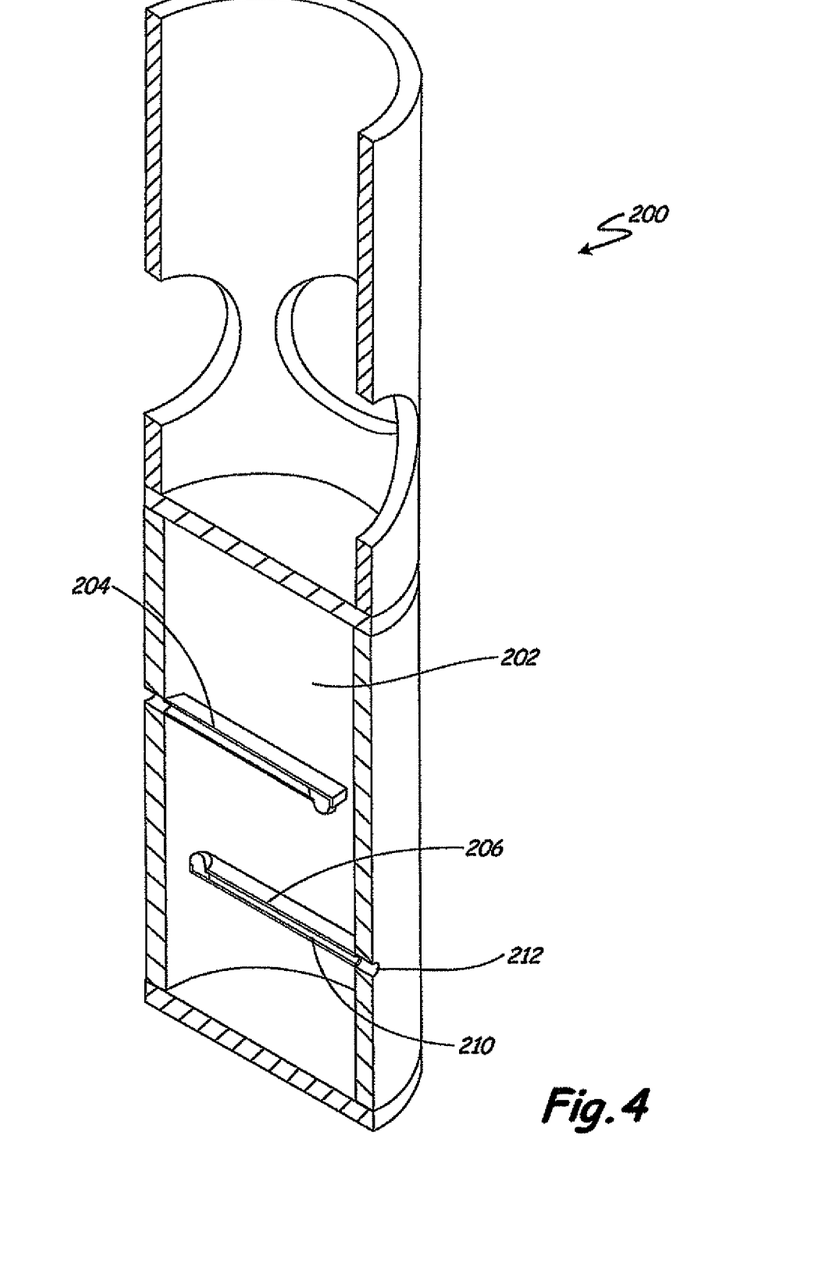
FIG. 4 is a cross-sectional view of one example embodiment of a variable resonator.

FIG. 4 is a cross-sectional view of an example of a variable resonator 200. Variable resonator 200 can be placed at down hole location 106 and used, in this example, to measure temperature and pressure. In the embodiment of FIG. 4, resonator 200 includes a sealed evacuated volume 202 which carries cantilevered beams 204 and 206. Beam 204 is a temperature responsive cantilever beam and beam 206 is a pressure responsive cantilever beam. For example, beam 204 can have a bimetallic composition whereby changes in temperature cause changes the tension of the beam 204 and thereby changes the resonant frequency of the beam 204. Cantilever beam 206 includes an interior space 210 coupled to process fluid outside of the evacuated volume 202 through opening 212. Changes in the pressure of the process fluid will cause the tension of the beam 206 to change, thereby changing the resonant frequency of the beam 206. Preferably, the resonant frequency range of beams 204 and 206 are sufficiently spaced apart so that their individual acoustic signatures can be detected and isolated at the surface.

Figure 5:
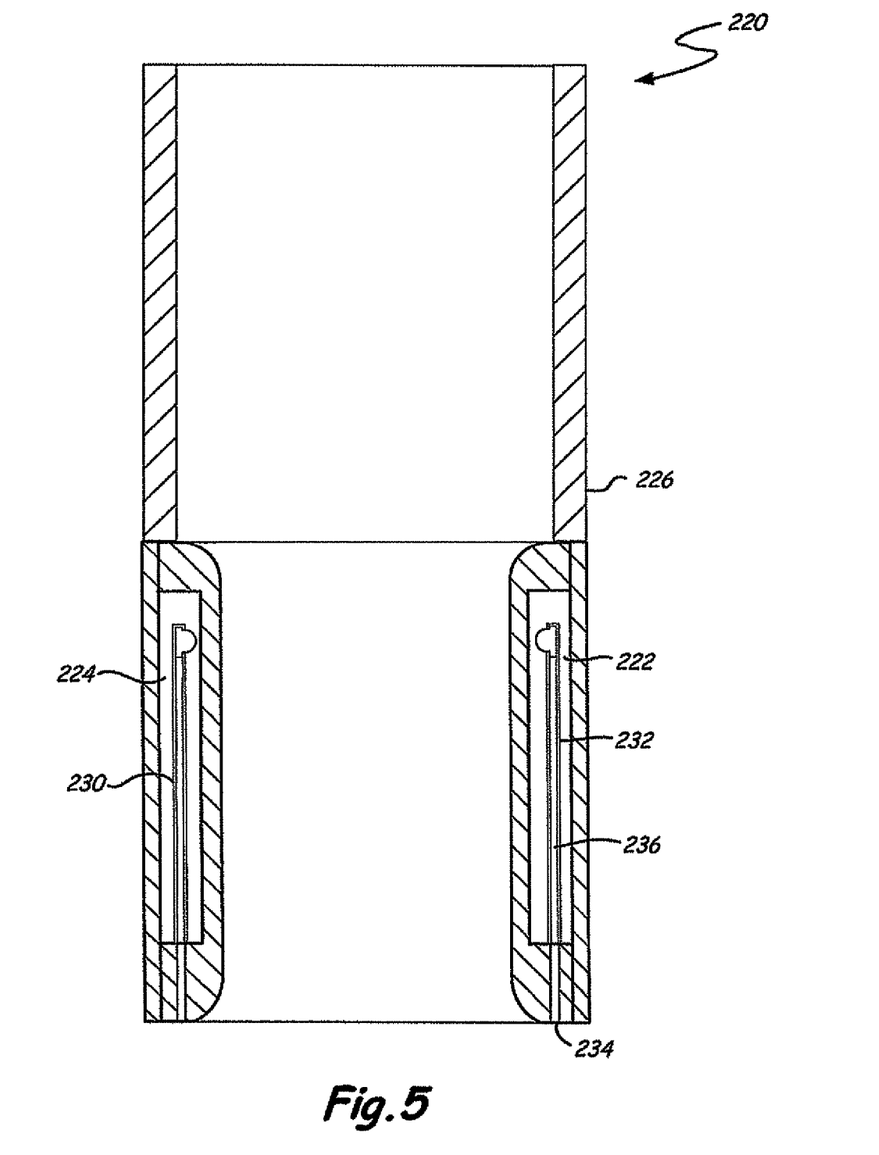
FIG. 5 is another example view of a variable resonator built into a wall of a pipe.

FIG. 5 is a cross-sectional view of another example embodiment of a variable resonator 220 in which the resonating components are built into the exterior wall of piping 226. This configuration may be preferable as it leaves the interior of pipe 226 free to carry fluid. Variable resonator 220 includes evacuated spaces 222 and 224 formed in walls 226. Space 224 carries temperature responsive cantilever beam 230 and space 222 carries pressure responsive cantilever beam 232. As discussed above, beam 230 can comprise a bimetallic material having a resonant frequency responsive to temperature. Similarly, beam 232 includes an interior space 236 coupled to the process fluid through opening 234 and has a resonant frequency which changes in response to pressure in the process fluid. The evacuated volumes 222 and 224 can be placed on the interior or exterior diameter of piping 226.

In another example configuration, elements 204, 206, 230 and 232 shown in FIGS. 4 and 5 comprise tuning forks rather than cantilever beams. In some configurations, a tuning fork is preferable as it provides a more efficient design in which the stored resonant energy tends to remain longer within the structure due to the constant center of mass.

Figure 6:
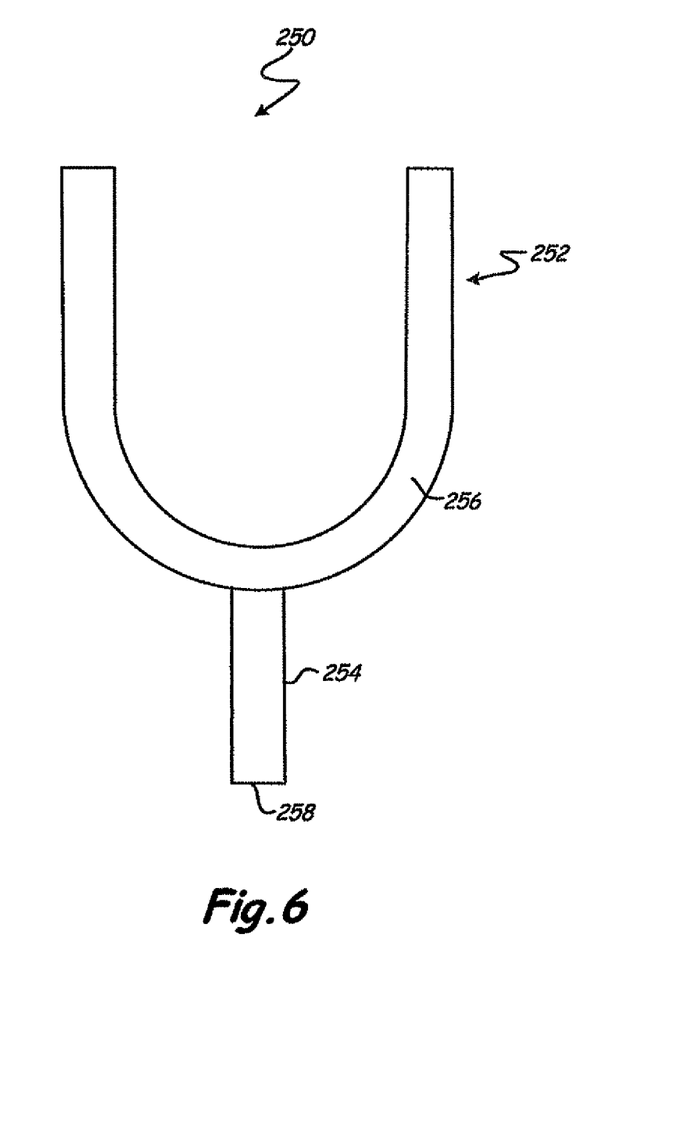
FIG. 6 is a diagram of a tuning fork.

FIG. 6 is a simplified view of a tuning fork 250 which serves as a resonant component in accordance with another example configuration of the present invention. Tuning fork 250 comprises a fork portion 252 coupled to a stem 254. If fork 250 is formed of a bimetallic material, the resonant frequency of the fork 250 will vary based upon temperature. In another example configuration, fork 250 includes an interior space 256 which may be filled with, for example, an isolation fill fluid such as an oil. An isolation diaphragm 258 couples to process fluid as discussed in connection with components 206 and 232 above. As the process fluid applies pressure to the isolation diaphragm 258, the pressure within interior volume 256 changes thereby changing the resonant frequency of the fork 250.

In one configuration, the resonant component is placed in an evacuated volume to thereby reduce any damping which might occur. The fundamental resonant frequency of the tuning fork, which is the frequency when no pressure is applied to diaphragm 258, can be estimated using the equation:

$$F_F = \frac{K_o \frac{(R_i + R_o)}{2}}{2\pi L^2} \sqrt{\frac{E}{2\rho}} \quad \text{Equation 1}$$

$F_F$ = Fundamental frequency = 432.4 Hz $K_o$ = Constant = 3.52

$R_i$ = Radius of tube hole = $4 * 10^{-3}$ m $R_o$ = Radius of tube = $6 * 10^{-3}$ m $L$ = Length of tuning fork tine = $1.5 * 10^{-1}$ m $E$ = Young's modulus = $1.93 * 10^{11} \frac{\text{kg}}{\text{ms}^2}$ $\rho$ = Density = $8 * 10^3 \frac{\text{kg}}{\text{m}^2}$ This assumes that the tuning fork is made of stainless steel and results in a fundamental frequency of 432.4

The resonant frequency as a function of pressure can be estimated using the following equation:

$$F_F = F_0 \sqrt{1 + \frac{4R_i^2 L^2 P}{3(R_0^4 - R_i^4)E}} \quad \text{Equation 2}$$

$P$ = internal tuning fork pressure

In many instances it is desirable to non-intrusively measure pressure or temperature in vessels such as pipes or tanks in an industrial process such as a refinery or chemical plant. Measuring process variables with traditional methods typically requires penetrations through vessel walls. These penetrations can be expensive and potentially dangerous under certain conditions such as the presence of very high pressures, high temperatures, or dangerous processes. The embodiments discussed in FIGS. 3, 4, 5, and 6 for down hole measurements are applicable to any measurements including surface vessels such as pipes and tanks.

Although the present invention has been described with reference to preferred embodiments, workers skilled in the art will recognize that changes may be made in form and detail without departing from the spirit and scope of the invention. In one configuration, the "down hole" location discussed above comprises a remote or otherwise spaced apart location from the measurement circuitry which is positioned at a local location.

What is claimed is:

1. A sensor system for sensing a process variable of a process fluid at a first location in a well, comprising:
    a variable resonator disposed in contact with the process fluid at the first location in the well having a resonant frequency which varies in response to the process variable of the fluid and responsively provides a reflected acoustic signal at the resonant frequency indicative of the process variable, wherein the first location comprises a down hole location in the well;
    an acoustic sensor disposed at a second location spaced apart from the variable resonator and configured to receive the resonant acoustic signal transmitted from the variable resonator, wherein the second location comprises a location proximate earth surface; and
    measurement circuitry coupled to the acoustic sensor configured to provide a process variable output related to the process variable of the fluid in response to the frequency of the acoustic signal received from the variable resonator, wherein the process variable of the fluid comprises at least one of pressure and flow;
    wherein the reflected acoustic signal is carried along a pipe of the well;
    wherein the variable resonator includes an elongate element having an interior cavity and the interior cavity is coupled to a pressure of the fluid.

2. The apparatus of claim 1 including an acoustic source coupled to a pipe at a position spaced apart from the variable resonator configured to transmit an acoustic signal to the first location.

3. The apparatus of claim 1 including an isolation diaphragm configured to isolate the interior of the elongate member from the fluid.

4. The apparatus of claim 1 including a second variable resonator having a resonant frequency that is indicative of the temperature.

5. The apparatus of claim 4 wherein the variable resonator comprises an elongate element formed as a bimetallic material.

6. The apparatus of claim 1 wherein the variable resonator comprises a cantilever beam.

7. The apparatus of claim 1 wherein the variable resonator comprises a tuning fork.

8. The apparatus of claim 1 wherein the variable resonator includes a plurality of resonant elements each configured to resonate in a different frequency range.

9. The apparatus of claim 8 wherein the resonant elements are configured to measure different process variables of the fluid.

10. The apparatus of claim 1 wherein the fluid comprises a down hole fluid.

11. A method of sensing a process variable of process fluid at a first location in a well, comprising:
- placing a variable resonator in contact with the process fluid at the first location in the well, wherein the first location comprises a down hole location in the well;
- causing the variable resonator located at the first location to resonate, the variable resonator having a resonant frequency which varies in response to the process variable of the fluid;
- responsively providing a resonant acoustic signal from the variable resonator;
- receiving the resonant acoustic signal in an acoustic sensor at a second location which is spaced apart from the first location, wherein the second location comprises a location proximate earth surface, wherein the reflected acoustic signal is carried along a pipe of the well; and
- determining the process variable of the fluid as a function of the frequency of the resonant acoustic signal received in the acoustic sensor from the variable resonator spaced apart from the acoustic sensor, wherein the process variable of the fluid comprises at least one of pressure and flow;
- wherein the variable resonator includes an elongate element having an interior cavity and the interior cavity is coupled to a pressure of the fluid.

12. The method of claim 11 including transmitting an acoustic signal from the second location to the first location.

13. The method of claim 11 including sensor temperature using a second variable resonator.

* * * * *